US012497332B2

(12) United States Patent
Sato et al.

(10) Patent No.: US 12,497,332 B2
(45) Date of Patent: *Dec. 16, 2025

(54) INORGANIC STRUCTURE AND METHOD FOR PRODUCING SAME

(71) Applicant: Panasonic Intellectual Property Management Co., Ltd., Osaka (JP)

(72) Inventors: Natsuki Sato, Osaka (JP); Ryosuke Sawa, Osaka (JP); Tatsuro Yoshioka, Osaka (JP); Naoki Kurizoe, Osaka (JP); Tohru Sekino, Osaka (JP); Tomoyo Goto, Osaka (JP); Sunghun Cho, Osaka (JP); Yeongjun Seo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 451 days.

This patent is subject to a terminal disclaimer.

(21) Appl. No.: 17/926,597

(22) PCT Filed: May 11, 2021

(86) PCT No.: PCT/JP2021/017825
§ 371 (c)(1),
(2) Date: Nov. 20, 2022

(87) PCT Pub. No.: WO2021/241193
PCT Pub. Date: Dec. 2, 2021

(65) Prior Publication Data
US 2023/0202927 A1     Jun. 29, 2023

(30) Foreign Application Priority Data

May 27, 2020   (JP) ................... 2020-092468

(51) Int. Cl.
*C04B 35/053*   (2006.01)
*C04B 35/628*   (2006.01)
*C04B 35/645*   (2006.01)

(52) U.S. Cl.
CPC ...... *C04B 35/053* (2013.01); *C04B 35/62807* (2013.01); *C04B 35/62886* (2013.01);
(Continued)

(58) Field of Classification Search
CPC ............ C04B 35/053; C04B 35/62807; C04B 2235/3206; C04B 2235/3445; C01B 33/22
See application file for complete search history.

(56) References Cited

U.S. PATENT DOCUMENTS

2005/0200683 A1    9/2005  Tanaka et al.
2017/0189960 A1*   7/2017  Ibe .............. B22F 1/052
2020/0384527 A1*  12/2020  Böhnke ........... C04B 28/006

FOREIGN PATENT DOCUMENTS

CN        1594081 A      3/2005
CN      103044062 A      4/2013
(Continued)

OTHER PUBLICATIONS

Shigeyoshi Nagataki, "Current Status of Research on Silica Fume, Silica Fume in Concrete—An Ovreview", Journal of JSCE, 1995, No. 508, V-26, p. 1-13, with English translation.
(Continued)

*Primary Examiner* — Laura A Auer
(74) *Attorney, Agent, or Firm* — Renner, Otto, Boisselle & Sklar, LLP

(57) ABSTRACT

Provided is an inorganic structure including a plurality of magnesium oxide particles; and a binding part that covers a surface of each of the magnesium oxide particles and binds the magnesium oxide particles together. The binding part
(Continued)

contains an amorphous compound containing silicon, a metallic element other than silicon, and oxygen, and contains substantially no alkali metal, B, V, Te, P, Bi, Pb, and Zn. Also provided is a method for producing an inorganic structure including: a step for obtaining a mixture by mixing a plurality of magnesium oxide particles, a plurality of amorphous silicon dioxide particles, and an aqueous solution containing a metallic element other than silicon; and a step for pressurizing and heating the mixture under conditions of a pressure of 10 to 600 MPa and a temperature of 50 to 300° C.

12 Claims, 9 Drawing Sheets

(52) U.S. Cl.
CPC .... *C04B 35/645* (2013.01); *C04B 2235/3206* (2013.01); *C04B 2235/3445* (2013.01); *C04B 2235/5454* (2013.01); *C04B 2235/656* (2013.01); *C04B 2235/9607* (2013.01)

(56) References Cited

FOREIGN PATENT DOCUMENTS

| GB | 1434737 A | 5/1976 |
|---|---|---|
| JP | S54-142212 A | 11/1979 |
| JP | 2004-025853 A | 1/2004 |
| JP | 2009-215144 A | 9/2009 |
| JP | 2012-144801 A | 8/2012 |
| JP | 2016-023114 A | 2/2016 |
| JP | 2016-113335 A | 6/2016 |
| WO | 2020/017526 A1 | 1/2020 |

OTHER PUBLICATIONS

International Search Report for corresponding Application No. PCT/JP2021/017825, mailed Aug. 3, 2021.
Written Opinion for corresponding Application No. PCT/JP2021/017825, mailed Aug. 3, 2021.
Jans Sens, w. et al., ChemSusChem, Nov. 19, 2014, vol. 8, pp. 994-1008, <DOI:10.1002/cssc.201402894>.
Zhao, F. et al., Ceramics International, Oct. 9, 2018, vol. 45, pp. 2953-2961, <DOI:10.1016/j.ramint.2018.09.296>.
Sadek, H. E. H. et al., Interceram-International Ceramic Review, Aug. 1, 2016, vol. 65, pp. 174-178, <DOI:10.1007/BF03401166>.
Extended European Search Report for corresponding EP Application No. 21812223.2 issued Aug. 8, 2024.

* cited by examiner (a)

(b)

(a) POSITION 1

(b) POSITION 2

(c) POSITION 3

INORGANIC STRUCTURE AND METHOD FOR PRODUCING SAME

TECHNICAL FIELD

The present invention relates to an inorganic structure and a method for producing the inorganic structure.

BACKGROUND ART

A sintering method is a known method for producing inorganic structures made from ceramics. The sintering method is a method for obtaining a sintered body by heating an aggregate of a solid powder made from an inorganic substance at a temperature lower than the melting point.

Patent Literature 1 discloses a method for producing a high-density magnesia sintered body. Specifically, Patent Literature 1 discloses that magnesia obtained by pyrolyzing and temporarily sintering a magnesium compound is pressurized and molded, and the molded body is sintered to obtain a magnesia sintered body. Moreover, Patent Literature 1 discloses that the sintering of the molded body is performed at 1250 to 1400° C. for approximately 20 minutes.

CITATION LIST

Patent Literature

Patent Literature 1: Japanese Unexamined Patent Application Publication No. s54-142212

SUMMARY OF THE INVENTION

However, in the sintering method, energy consumption during manufacturing is large and costly because the solid powder needs to be heated at a high temperature. In addition, if only a solid powder is compacted under low temperature conditions, particles of the solid powder are not sufficiently bound to each other, and thus, the obtained compact has many pores and lacks mechanical strength.

The present invention has been made in consideration of the above issue, which is inherent in the related art. An object of the present invention is to provide an inorganic structure that is prepared through a simple method and has a higher density, and a method for producing the inorganic structure.

In response to the above issue, an inorganic structure according to a first aspect of the present invention includes a plurality of magnesium oxide particles, and a binding part that covers a surface of each of the magnesium oxide particles and binds the magnesium oxide particles together. The binding part contains an amorphous compound containing silicon, a metallic element other than silicon, and oxygen, and contains substantially no alkali metal, B, V, Te, P, Bi, Pb, and Zn.

A method for producing an inorganic structure according to a second aspect of the present invention includes a step for obtaining a mixture by mixing a plurality of magnesium oxide particles, a plurality of amorphous silicon dioxide particles, and an aqueous solution containing a metallic element other than silicon, and a step for pressurizing and heating the mixture under conditions of a pressure of 10 to 600 MPa and a temperature of 50 to 300° C.

BRIEF DESCRIPTION OF DRAWINGS

FIG. 5($b$) is a scanning electron microscope image of magnesia powder magnified 300 times.

FIG. 6($b$) is a diagram illustrating an energy-dispersive X-ray analysis spectrum in the part of a symbol A in FIG. 6($a$). FIG. 6($c$) is a diagram illustrating an energy-dispersive X-ray analysis spectrum in the part of a symbol B in FIG. 6($a$).

FIG. 7($a$) is a scanning electron microscope image of the test sample 1 magnified 500 times, FIG. 7($b$) is a diagram illustrating mapping data of silicon, and FIG. 7($c$) is a diagram illustrating mapping data of magnesium.

FIG. 8($b$) is a scanning electron microscope image of the part of a symbol C in FIG. 8($a$) magnified 10,000 times.

FIG. 9($b$) is a diagram illustrating a reflected electron image at position 2 in the test sample 1. FIG. 9($c$) is a diagram illustrating a reflected electron image at position 3 in the test sample 1.

FIG. 10($b$) is a diagram illustrating binarized data of the reflected electron image at position 2 in the test sample 1. FIG. 10($c$) is a diagram illustrating the binarized data of the reflected electron image at position 3 in the test sample 1.

DESCRIPTION OF EMBODIMENTS

Figure 1:
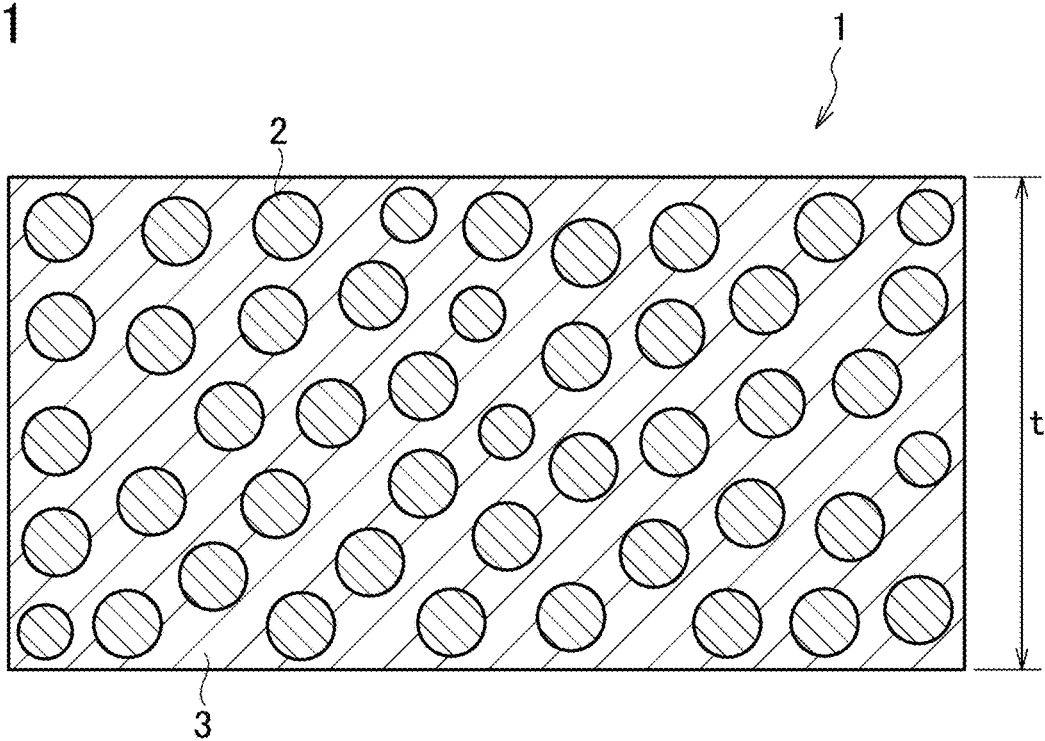
FIG. 1 is a schematic cross-sectional view of an example of an inorganic structure according to the present embodiment.

Referring to the drawings, a detailed description is given below of an inorganic structure and a method for producing the inorganic structure. Note that dimensional ratios in the drawings are exaggerated for convenience of explanation and are sometimes different from actual ratios.

[Inorganic Structure]

As illustrated in FIG. 1, an inorganic structure 1 according to the present embodiment includes multiple magnesium oxide particles 2. Adjacent magnesium oxide particles 2 are bound to each other through a binding part 3 to form the inorganic structure 1, which is an aggregate of the magnesium oxide particles 2.

The magnesium oxide particles 2 contain magnesium oxide (magnesia, MgO) as a main component. That is, the magnesium oxide particles 2 preferably contain magnesium oxide at 50 mol % or more, more preferably 80 mol % or more, particularly preferably 90 mol % or more.

The magnesium oxide particles 2 are preferably crystalline. Since the magnesium oxide particles 2 are crystalline particles, it is possible to obtain the inorganic structure 1 with higher durability compared to the case of amorphous particles. Note that the magnesium oxide particles 2 may be single crystal particles or polycrystalline particles.

The average particle size of the magnesium oxide particles 2 making up the inorganic structure 1 is not limited. However, the average particle size of the magnesium oxide particles 2 is preferably 300 nm or more to 50 μm or less, more preferably 300 nm or more to 30 μm or less, particularly preferably 300 nm or more to 20 μm or less. When the average particle size of the magnesium oxide particles 2 is within these ranges, the magnesium oxide particles 2 are strongly bound to each other, which makes it possible to increase the strength of the inorganic structure 1. When the average particle size of the magnesium oxide particles 2 is within these ranges, the percentage of pores present inside the inorganic structure 1 is 20% or less as described below, which makes it possible to increase the strength of the inorganic structure 1. In this description, unless otherwise noted, the "average particle size" is a value calculated as an average of the particle sizes of particles observed in several to tens of visual fields using observation means such as a scanning electron microscope (SEM) or a transmission electron microscope (TEM).

The shape of the magnesium oxide particles 2 is not limited but can be spherical, for example. The magnesium oxide particles 2 may have a whisker shape (needle shape) or a scale shape. Particles having a whisker shape or a scale shape have a higher degree of contact with other particles and with the binding part 3 compared to particles having a spherical shape, which makes it possible to increase the strength of the entire inorganic structure 1.

The inorganic structure 1 according to the present embodiment includes the binding part 3, which binds the multiple magnesium oxide particles 2 together. Since adjacent magnesium oxide particles 2 are bound through the binding part 3, the magnesium oxide particles 2 are bound to each other in three dimensions, and thus it is possible to obtain a bulk body having high mechanical strength.

The binding part 3 contains an amorphous compound containing at least silicon, a metallic element other than silicon, and oxygen. As described below, it is possible to obtain the inorganic structure 1 by heating and pressurizing a mixture obtained by mixing magnesium oxide particles, amorphous silicon dioxide particles, and an aqueous solution containing a metallic element other than silicon. At this time, the silicon dioxide particles react with the aqueous solution to form an amorphous compound containing silicon, a metallic element, and oxygen. Thus, the binding part 3 contains an amorphous compound containing at least silicon, a metallic element other than silicon, and oxygen.

Note that it is preferable that the binding part 3 contain an amorphous compound as a main component. Specifically, the binding part 3 preferably contains the amorphous compound at 50 mol % or more, more preferably 70 mol % or more, even more preferably 90 mol % or more.

The metallic element other than silicon contained in the amorphous compound of the binding part 3 can be at least one selected from the group consisting of an alkali metal, an alkaline earth metal, a transition metal, a base metal, and a semimetal. Note that in this description, the alkaline earth metal includes beryllium and magnesium in addition to calcium, strontium, barium, and radium. The base metal includes aluminum, zinc, gallium, cadmium, indium, tin, mercury, thallium, lead, bismuth, and polonium. The semimetal includes boron, silicon, germanium, arsenic, antimony, and tellurium.

In the amorphous compound in the binding part 3, the metallic element other than silicon is preferably magnesium. As described below, it is possible to obtain the inorganic structure 1 by heating and pressurizing a mixture obtained by mixing magnesium oxide particles, amorphous silicon dioxide particles, and an aqueous solution containing magnesium. Here, the silicon dioxide particles react with the aqueous solution containing magnesium to form an amorphous compound containing silicon, oxygen, and magnesium. Thus, the binding part 3 preferably contains an amorphous compound containing silicon, oxygen, and magnesium.

Note that it is preferable that the binding part 3 contain substantially no alkali metal, B, V, Te, P, Bi, Pb, and Zn. It is preferable that the binding part 3 contain substantially no Ca, Sr, and Ba. In this description, "the binding part contains substantially no alkali metal, B, V, Te, P, Bi, Pb, and Zn" means that the binding part 3 is not made to contain an alkali metal, B, V, Te, P, Bi, Pb, and Zn on purpose. Thus, when one or more of an alkali metal, B, V, Te, P, Bi, Pb, and Zn are mixed as unavoidable impurities in the binding part 3, the condition in which "the binding part contains substantially no alkali metal, B, V, Te, P, Bi, Pb, and Zn" is satisfied. In a similar manner, in this description, "the binding part contains substantially no Ca, Sr, and Ba" means that the binding part 3 is not made to contain Ca, Sr, and Ba on purpose. Thus, when one or more of Ca, Sr, and Ba are mixed as inevitable impurities in the binding part 3, the condition in which "the binding part contains substantially no Ca, Sr, and Ba" is satisfied.

The binding part 3 is preferably in direct contact with the magnesium oxide particles 2. It is preferable that the binding part 3 cover at least a part of the surface of each of the magnesium oxide particles 2, and it is more preferable that the binding part 3 cover the entire surface of each of the magnesium oxide particles 2. Thus, the magnesium oxide particles 2 and the binding part 3 are firmly bound, and thus it is possible to obtain the inorganic structure 1 having excellent density and mechanical strength.

Here, since being deliquescent, magnesium oxide can be degraded by moisture in the air, as well as by acids and alkalis. However, in the inorganic structure 1, the magnesium oxide particles 2 are covered by the binding part 3, and thus the contact of the magnesium oxide particles 2 with moisture, acids, and alkalis is prevented. Thus, it is possible to prevent the degradation of the magnesium oxide particles 2 and to enhance the water, acid, and alkaline resistance of the inorganic structure 1.

Figure 2:
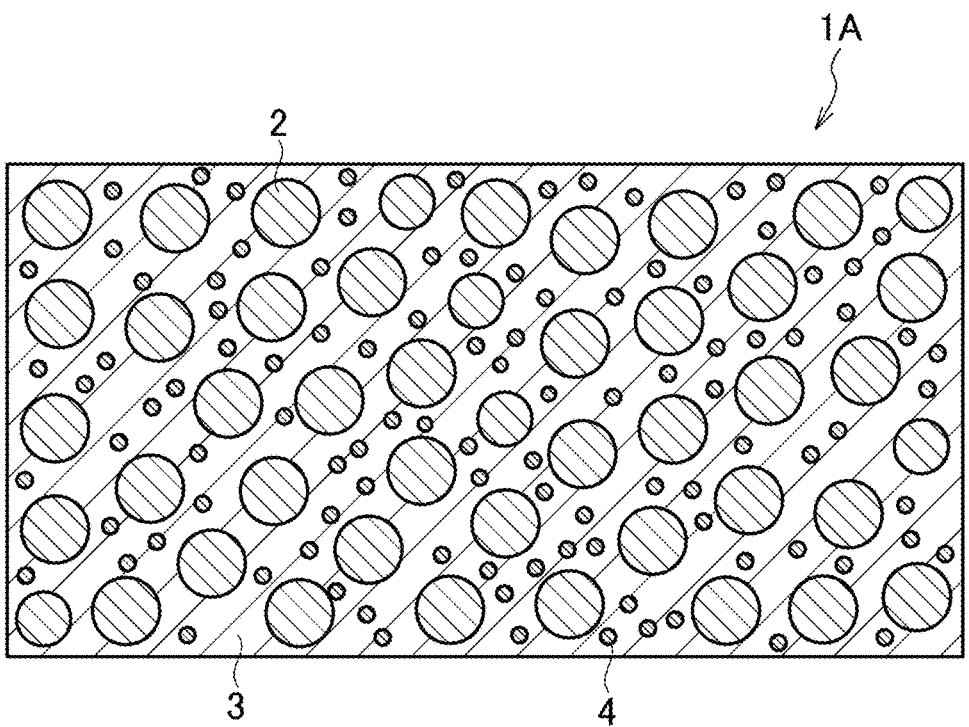
FIG. 2 is a schematic cross-sectional view of another example of the inorganic structure according to the present embodiment.

As illustrated in FIG. 2, in an inorganic structure 1A, the binding part 3 may include fine particles 4 having an average particle size of 100 nm or less. Since the binding part 3 includes multiple fine particles 4, the binding part 3 has a denser structure, and thus it is possible to increase the strength of the inorganic structure 1A.

As described above, the binding part 3 is formed through a reaction of amorphous silicon dioxide particles with an aqueous solution containing a metallic element other than silicon due to heating and pressurization. Thus, particulate matter derived from the silicon dioxide particles may be included inside the binding part 3. As described below, the particle size of the amorphous silicon dioxide particles is preferably 100 nm or less. Thus, the binding part 3 may include the fine particles 4 derived from the silicon dioxide particles and having an average particle size of 100 nm or less. Note that the particle size of the fine particles 4 included in the binding part 3 can be measured using a scanning electron microscope or a transmission electron microscope.

The fine particles 4 included in the binding part 3 may be particles made from an amorphous compound containing silicon, oxygen, and a metallic element other than silicon. The fine particles 4 may be particles made from a crystalline compound containing silicon, oxygen, and a metallic element other than silicon. The fine particles 4 included in the binding part 3 may be particles made from an amorphous compound containing silicon, oxygen, and magnesium. The fine particles 4 may be particles made from a crystalline compound containing silicon, oxygen, and magnesium. Note that the fine particles 4 may contain silicon dioxide that did not react with an aqueous solution containing a metallic element other than silicon.

It is preferable that the volume ratio of the magnesium oxide particles 2 be larger than that of the binding part 3 in the inorganic structure 1, 1A. Here, the obtained inorganic structure 1, 1A is likely to utilize properties of the magnesium oxide particles 2. Specifically, the magnesium oxide particles 2 have a high thermal conductivity of about 60 W/m·K and have excellent thermal conductivity. Thus, by making the volume ratio of the magnesium oxide particles 2 larger than that of the binding part 3, it is possible to improve the thermal conductivity of the entire inorganic structure 1, 1A.

The binding part 3 preferably further contains crystalline silicon-magnesium complex oxide. As described above, the binding part 3 contains an amorphous compound containing silicon and oxygen and more preferably contains an amorphous compound containing silicon, oxygen, and magnesium. Thus, the crystal structure of the binding part 3 is at least partially amorphous. However, it is preferable that the binding part 3 contain crystalline silicon-magnesium complex oxide in addition to the amorphous compound. Further inclusion of crystalline silicon-magnesium complex oxide in the binding part 3 makes it possible to enhance the chemical stability of the inorganic structure 1, 1A compared to the case where the binding part 3 is made from only the amorphous compound. Note that the silicon-magnesium complex oxide is an oxide containing at least silicon and magnesium, and examples include magnesium silicate.

As described above, in the inorganic structure 1, 1A, the binding part 3 preferably contains an amorphous compound containing silicon, oxygen, and magnesium. Note that in the amorphous compound, the ratio of silicon to magnesium is not limited. When the binding part 3 contains the fine particles 4, the fine particles 4 may be particles made from the amorphous compound containing silicon, oxygen, and magnesium, or particles made from crystalline silicon-magnesium complex oxide. The fine particles 4 may contain silica derived from silicon dioxide particles, which are the raw material. The binding part 3 may contain silicon-magnesium complex oxide as a crystalline compound.

As described above, the binding part 3 is formed through the reaction of amorphous silicon dioxide particles with an aqueous solution containing a metallic element other than silicon due to heating and pressurization, resulting in a dense phase. Pores may be present in at least one location of inside the binding part 3 or between the binding part 3 and the magnesium oxide particles 2.

The porosity in the cross section of the inorganic structure 1, 1A is preferably 20% or less. That is, when the cross section of the inorganic structure 1, 1A is observed, the average value of the percentage of pores per unit area is preferably 20% or less. When the porosity is 20% or less, the proportion of the inorganic structure 1, 1A in which the magnesium oxide particles 2 are bound to each other by the binding part 3 increases, and thus the inorganic structure 1, 1A become denser and has increased strength. This makes it possible to improve the machinability of the inorganic structure 1, 1A. When the porosity is 20% or less, the occurrence of cracks starting from pores in the inorganic structure 1, 1A is prevented, and thus it is possible to increase the bending strength of the inorganic structure 1, 1A. Note that the porosity in the cross section of the inorganic structure 1, 1A is preferably 10% or less, more preferably 8% or less, even more preferably 5% or less. The lower the porosity in the cross section of the inorganic structure 1, 1A, the more cracks starting from pores are prevented, which makes it possible to increase the strength of the inorganic structure 1, 1A.

In this description, the porosity is determined as follows. First, a cross section of the inorganic structure 1, 1A is observed to discriminate among the magnesium oxide particles 2, the binding part 3, and pores. Then, the unit area and the area of the pores in that unit area are measured to obtain the percentage of the pores per unit area, which is defined as the porosity. Note that it is more preferable to obtain the percentage of pores per unit area at multiple points in a cross section of the inorganic structure 1, 1A and then to define the average value of the percentage of the pores per unit are as the porosity. When a cross section of the inorganic structure 1, 1A is observed, an optical microscope, a scanning electron microscope (SEM), and a transmission electron microscope (TEM) are usable. The unit area and the area of pores in that unit area may be measured through binarizing an image observed using a microscope.

The size of pores inside the inorganic structure 1, 1A is not limited but is preferably as small as possible. When the size of pores is small, cracks starting from pores are prevented, which makes it possible to increase the strength of the inorganic structure 1, 1A and to improve the machinability of the inorganic structure 1, 1A. Note that the size of pores in the inorganic structure 1, 1A is preferably 5 μm or less, more preferably 1 μm or less, even more preferably 100 nm or less. The size of pores inside the inorganic structure 1, 1A is determined by observing a cross section of the inorganic structure 1, 1A using a microscope in the same manner as the porosity described above.

It is sufficient for the inorganic structure 1, 1A to have a structure in which the magnesium oxide particles 2 are bound to each other through the binding part 3. Thus, as long as the inorganic structure 1, 1A has such a structure, its shape is not limited. The inorganic structure 1, 1A can have, for example, a plate shape, a film shape, a rectangular shape, a lumpy shape, a rod shape, or a spherical shape. When the inorganic structure 1, 1A has a plate shape or a film shape, its thickness t is not limited but can be 50 μm or more, for example. The inorganic structure 1, 1A according to the present embodiment is formed by using a pressure heating method as described below. It is thus possible to easily obtain the inorganic structure 1, 1A having a large thickness. Note that the thickness t of the inorganic structure 1, 1A may be 500 μm or more, 1 mm or more, or 1 cm or more. The upper limit of the thickness t for the inorganic structure 1, 1A is not limited but can be 50 cm, for example.

In the inorganic structure 1, 1A, the multiple magnesium oxide particles 2 are bound to each other through the binding part 3 and thus are not bound by an organic binder made from an organic compound, nor by an inorganic binder other than the binding part 3. Thus, the inorganic structure 1, 1A retains the characteristics of the magnesium oxide particles 2 and the binding part 3. For example, the magnesium oxide particles 2 have high thermal conductivity properties, and thus the obtained inorganic structure 1, 1A also have excellent thermal conductivity properties.

As described above, the inorganic structure 1, 1A according to the present embodiment includes the multiple magnesium oxide particles 2 and the binding part 3 that covers the surface of each of the magnesium oxide particles 2 and binds the magnesium oxide particles 2 together. The binding part 3 contains an amorphous compound containing silicon, a metallic element other than silicon, and oxygen. The binding part 3 contains substantially no alkali metal, B, V, Te, P, Bi, Pb, and Zn. In the inorganic structure 1, 1A, the multiple magnesium oxide particles 2 are bound through the binding part 3 having high density. It is thus possible to obtain the inorganic structure 1, 1A having excellent density and mechanical strength. Since the binding part 3 covers the surface of each of the magnesium oxide particles 2, it is possible to prevent the deliquescence of the magnesium oxide particles 2 and to enhance the chemical stability of the inorganic structures 1, 1A.

Magnesium oxide has a thermal conductivity of about 60 W/m·K, which is high among ceramic materials. Thus, using the magnesium oxide particles 2 and making the binding part 3 from an amorphous compound containing silicon, oxygen, and magnesium provides the inorganic structure 1, 1A having excellent thermal conductivity in addition to excellent mechanical strength. Note that the inorganic structure 1, 1A preferably has a thermal conductivity of 2 W/m·K. or more, more preferably 5 W/m·K or more. The upper limit of the thermal conductivity of the inorganic structure 1, 1A is not limited, but can be 60 W/m·K, for example. Note that it is possible to measure the thermal conductivity according to the Japanese Industrial Standards JIS R1611 (method for measuring thermal diffusivity, specific heat capacity, and thermal conductivity of fine ceramics using a flash method).

As illustrated in FIGS. 1 and 2, the inorganic structure 1, 1A according to the present embodiment can be a structure in which only the magnesium oxide particles 2 are bound through the binding part 3. However, as described below, the inorganic structure 1, 1A is obtained by being pressurized while being heated at a temperature of 50 to 300° C., which makes it possible to add a member having low heat resistance to the inorganic structure 1, 1A. Specifically, the inorganic structure 1, 1A may contain organic matter or resin particles in addition to the magnesium oxide particles 2 and the binding part 3. A member added to the inorganic structure 1, 1A is not limited to one having low heat resistance, such as organic matter, and the inorganic structure 1, 1A may include particles made from an inorganic compound other than the magnesium oxide particles 2 and the binding part 3.

[Method for Producing Inorganic Structure]

Next, a method for producing the inorganic structure 1, 1A is described. It is possible to produce an inorganic structure by performing a step of mixing multiple magnesium oxide particles, multiple silicon dioxide particles, which are amorphous, and an aqueous solution to obtain a mixture and a step of pressurizing and heating the mixture.

Specifically, the mixture is prepared by first mixing a powder of magnesium oxide particles, silicon dioxide particles, and an aqueous solution. The magnesium oxide particles preferably contain magnesium oxide at 50 mol % or more, more preferably 80 mol % or more, particularly preferably 90 mol % or more.

The silicon dioxide particles are particles made from amorphous silicon dioxide. The silicon dioxide particles are preferably fumed particles, that is, fumed silica. Fumed silica is constituted by amorphous silica particles having a primary particle size of about 5 to 50 nm. The fumed silica is constituted by particles produced through combustion hydrolysis of silicon tetrachloride, and bulky secondary particles are formed through aggregation and agglomeration of primary particles. Thus, the fumed silica is highly reactive with an aqueous solution, and it is possible to easily form an amorphous compound containing silicon and oxygen.

As the aqueous solution, one containing a metallic element other than silicon is used. Note that the aqueous solution containing a metallic element other than silicon is an aqueous solution containing the metallic element as ions. The metallic element other than silicon can be at least one selected from the group consisting of an alkali metal, an alkaline earth metal, a transition metal, a base metal, and a semimetal. A solvent for dissolving the metallic element is preferably pure water or ion-exchanged water. In addition to water, the solvent may contain an acidic or alkaline substance, or an organic solvent, such as alcohol. Note that, hereinafter, "an aqueous solution containing a metallic element other than silicon" is also referred to as "a metallic element-containing aqueous solution".

It is preferable to use an aqueous solution containing magnesium as the aqueous solution. Note that the aqueous solution containing magnesium is an aqueous solution containing magnesium as ions, and for example, a magnesium acetate aqueous solution is usable. Note that hereafter, "an aqueous solution containing magnesium" is also referred to as "a magnesium-containing aqueous solution."

Figure 3:
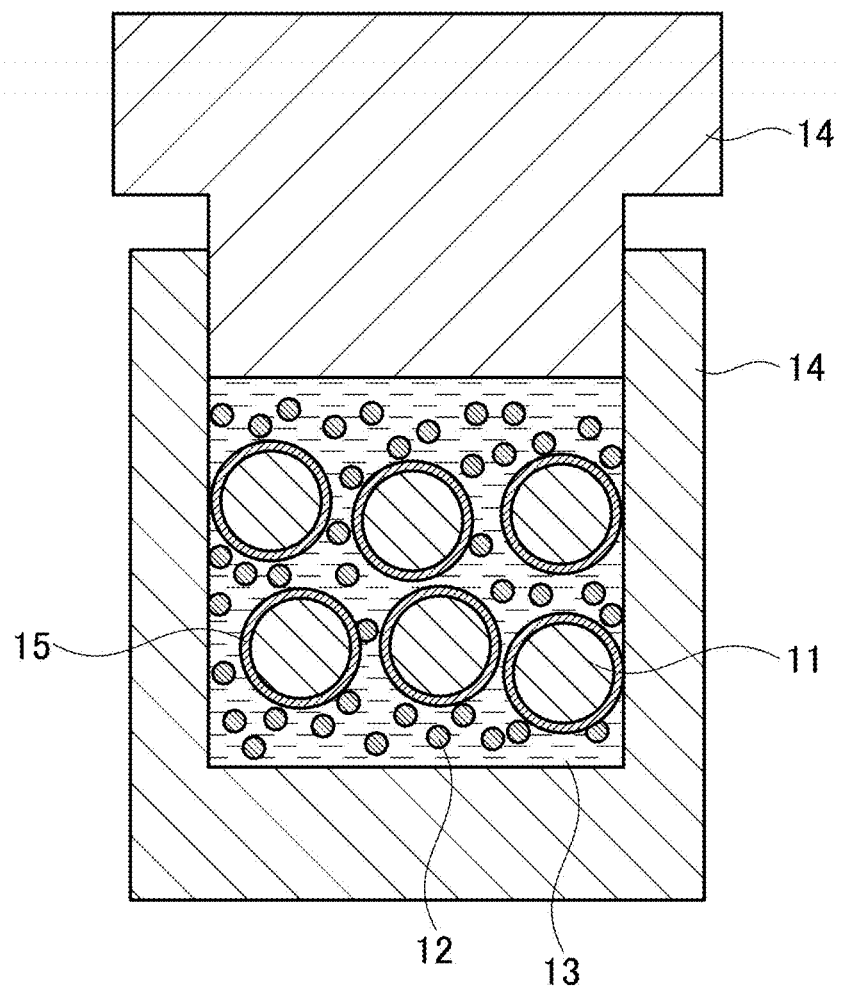
FIG. 3 is a schematic cross-sectional view for illustrating a method for producing the inorganic structure according to the present embodiment.

Then, as illustrated in FIG. 3, the mixture obtained by mixing magnesium oxide particles 11, silicon dioxide particles 12, and a metallic element-containing aqueous solution 13 is filled inside a die 14. After being filled with the mixture, the die 14 is heated as necessary. Then, applying pressure to the mixture inside the die 14 causes the inside of the die 14 to be a high-pressure state. At this time, since the silicon dioxide particles 12 are amorphous and highly reactive, the silicon dioxide particles 12 and the metallic element-containing aqueous solution 13 react to form the binding part 3 containing silicon, oxygen, and a metallic element other than silicon.

Here, when fumed silica is used as the silicon dioxide particles 12, the particle size of the fumed silica is at the nano-level, and thus the particles are filled without gaps among the magnesium oxide particles 11. Thus, the obtained binding part 3 has a dense structure and enables the magnesium oxide particles 11 to be tightly bound to each other.

When a magnesium-containing aqueous solution is used as the aqueous solution, both the magnesium oxide particles 11 and the magnesium-containing aqueous solution contain magnesium, which makes it easier for the magnesium to diffuse into each other. This facilitates the formation of a compound 15 containing silicon, oxygen, and magnesium, such as silicon-magnesium complex oxide, on the surface of each of the magnesium oxide particles 11, as illustrated in FIG. 3. Thus, the obtained binding part 3 tightly binds the magnesium oxide particles 11 while covering them, making it possible to increase the mechanical strength of the inorganic structure 1, 1A.

Then, taking out the molded body from the inside of the die provides the inorganic structure 1, 1A in which the multiple magnesium oxide particles 2 are bound to each other through the binding part 3.

Note that the heating and pressurizing conditions for the mixture obtained by mixing the magnesium oxide particles 11, the silicon dioxide particles 12, and the metallic element-containing aqueous solution 13 are not limited as long as the reaction of the silicon dioxide particles 12 with the metallic element-containing aqueous solution 13 proceeds. For example, it is preferable to pressurize the above-described mixture at a pressure of 10 to 600 MPa while heating at a temperature of 50 to 300° C. Note that the temperature for heating the mixture is more preferably 80 to 250° C., even more preferably 100 to 200° C. The pressure for pressurizing the mixture is more preferably 50 to 600 MPa, even more preferably 200 to 600 MPa.

Through the heating and pressurizing step described above, the amorphous silicon dioxide particles 12 may completely react with the metallic element-containing aqueous solution 13 to form a compound containing silicon, oxygen, and magnesium. The silicon dioxide particles 12 may not completely react with the metallic element-containing aqueous solution 13 to remain as silicon dioxide in the binding part 3.

Since the binding part 3 is formed through the reaction of the silicon dioxide particles 12 with the metallic element-containing aqueous solution 13, the binding part 3 may contain the fine particles 4 derived from the silicon dioxide particles and having an average particle size of 100 nm or less. Note that the fine particles 4 may contain silicon dioxide that did not react with the metallic element-containing aqueous solution 13.

As described above, it is possible to obtain the inorganic structure 1, 1A by pressurizing and heating the mixture obtained by mixing the magnesium oxide particles 11, the silicon dioxide particles 12, and the metallic element-containing aqueous solution 13 at a pressure of 10 to 600 MPa and at a temperature of 50 to 300° C. Through such a heating and pressurizing step, it is possible to form the binding part 3 containing an amorphous compound. By increasing the heating and pressurizing time of the above-described mixture, a part of the amorphous compound crystallizes. Thus, for example, when the binding part 3 is made to further contain crystalline silicon-magnesium complex oxide, it is preferable to lengthen the heating and pressurizing time of the mixture of the magnesium oxide particles, the silicon dioxide particles, and the magnesium-containing aqueous solution.

In the producing method according to the present embodiment, as the amorphous silicon dioxide particles, it is preferable to use fumed particles, that is, fumed silica. Here, alumina ($Al_2O_3$) and titania ($TiO_2$) are also present as fumed particles. Thus, at least one of fumed alumina or fumed titania may be further mixed into the mixture obtained by mixing the magnesium oxide particles 11, the silicon dioxide particles 12, and the metallic element-containing aqueous solution 13. This causes the fumed alumina and/or the fumed titania to react with the metallic element-containing aqueous solution 13 and enables the reaction product to be included in the binding part 3.

Here, a possible method for forming an aggregate of magnesium oxide particles is to press only powder of magnesium oxide particles. However, even if the powder of magnesium oxide particles is put into a die and pressurized at normal temperature, the magnesium oxide particles are unlikely to react with each other, and it is difficult to firmly bind the particles together. Thus, the obtained compact has many pores and lacks mechanical strength.

Another possible method for forming an aggregate of magnesium oxide particles is to press only powder of the magnesium oxide particles to form a compact and then to calcine the compact at a high temperature (for example, 1700° C. or higher). When a compact of magnesium oxide particles is calcined at a high temperature, the magnesium oxide particles are sintered together to form a structure. However, even when the compact of magnesium oxide particles is calcined at a high temperature, the magnesium oxide particles are unlikely to sinter with each other, and thus the obtained structure has many pores and lacks mechanical strength. When magnesium oxide particles are calcined at a high temperature, a precise temperature control is necessary, which increases the manufacturing cost.

In contrast, in the producing method according to the present embodiment, a mixture obtained by mixing the magnesium oxide particles 11, the amorphous silicon dioxide particles 12, and the metallic element-containing aqueous solution 13 is heated and pressurized, and thus it is possible to obtain a dense and strong structure. In the producing method according to the present embodiment, the structure is obtained by being pressurized while being heated at the temperature of 50 to 300° C., which makes it possible to eliminate precise temperature control and to reduce the manufacturing cost.

As described above, the method for producing the inorganic structure 1, 1A according to the present embodiment includes a step of obtaining a mixture by mixing the multiple magnesium oxide particles 11, the multiple silicon dioxide particles 12, which are amorphous, and the aqueous solution 13 containing a metallic element other than silicon. The producing method further includes a step of pressurizing and heating the mixture under conditions of a pressure of 10 to 600 MPa and a temperature of 50 to 300° C. Thus, the producing method according to the present embodiment makes it possible to produce an inorganic structure having high density through a simple method.

[Member Provided with Inorganic Structure]

Next, a member provided with the inorganic structure 1 is described. As described above, the inorganic structure 1 is formable into a plate shape having a large thickness and also has excellent stability as it is dense. The inorganic structure 1 has high mechanical strength, and thus can be cut in the same manner as a general ceramic member and can undergo a surface treatment. Thus, the inorganic structure 1 can be suitably used as a building material. The building material is not limited, and possible examples include an exterior wall material (siding), a roof material, and the like. Road materials and outer groove materials are also possible examples of the building material.

It is also possible to suitably use the inorganic structure 1 as an electronic equipment material. Possible examples of the electronic equipment material include structural materials, heat-resistant materials, insulating materials, heat radiation materials, sealing materials, circuit boards, and optical materials.

EXAMPLES

The present embodiment is described below in more detail with reference to examples, but the present embodiment is not limited to these examples.

[Preparation of Test Samples]

First, magnesia powder (MgO, manufactured by Ube Material Industries, Ltd.) and amorphous silica powder (fumed silica, AEROSIL manufactured by NIPPON AEROSIL CO., LTD.) were prepared. Then, the magnesia powder and the silica powder were mixed in the proportions in Table 1 with acetone using an agate mortar and an agate pestle to obtain a mixed powder for each example. Note that in the mixed powder of an example 1, the volume ratio (vol %) of the magnesia powder (MgO) to the silica powder (SiO$_2$) was 62:38 (MgO:SiO$_2$).

An amount of 4 g of magnesium acetate tetrahydrate powder (Mg(CH$_3$COO)$_2$·4H$_2$O, manufactured by FUJIFILM Wako Pure Chemical Corporation) was dissolved in an amount of 6 ml of ion-exchanged water to obtain a magnesium acetate aqueous solution.

TABLE 1

|  | Magnesia | Silica | Magnesium acetate aqueous solution |
|---|---|---|---|
| Example 1 | 0.2 g | 0.0747 g | 160 μl |
| Example 2 | 0.2 g | 0.02241 g | 96 μl |
| Example 3 | 0.2 g | 0.0075 g | 96 μl |

Next, the mixed powder of each example was put in a cylindrical die (φ10 mm) for molding having an internal space. Then, the magnesium acetate aqueous solution in an amount in Table 1 was added in the die for molding and was mixed using a plastic spatula. Note that in the mixed powder containing the magnesium acetate aqueous solution in the example 1, SiO$_2$ was 250 mol % relative to Mg (CH$_3$COO)$_2$.

Then, the mixed powder containing the magnesium acetate aqueous solution was heated and pressurized under conditions of 150° C., 400 MPa, and 30 minutes. This resulted in a test sample 1 of the example 1, a test sample 2 of an example 2, and a test sample 3 of an example 3, which were each cylindrical.

[Evaluation of Test Samples]
(Crystal Structure Analysis)

Figure 4:
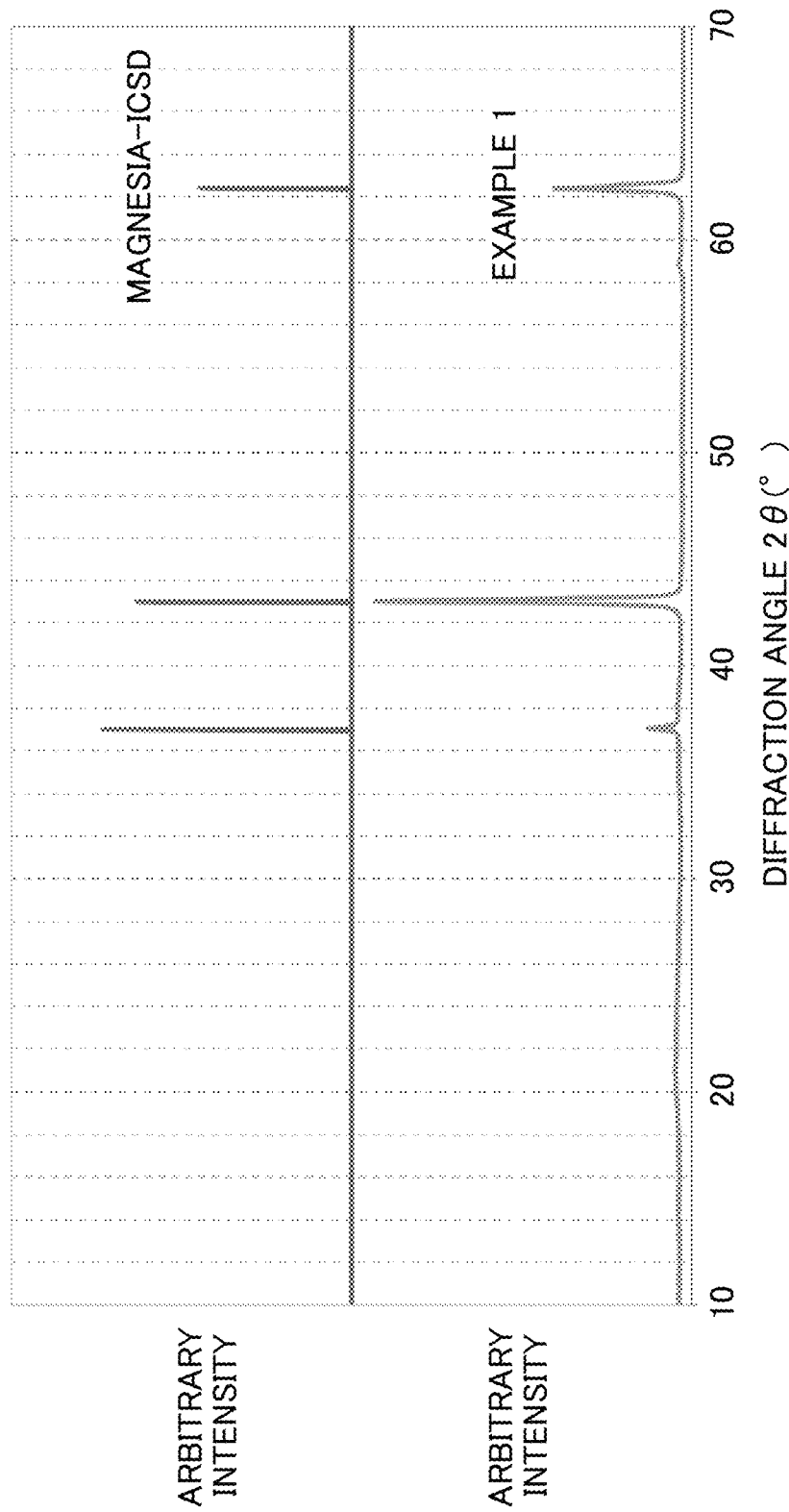
FIG. 4 is a graph illustrating an XRD pattern of magnesia registered in ICSD, and an XRD pattern of a test sample 1 of an example 1.

A powder X-ray diffraction (XRD) instrument was used to measure an XRD pattern of a powder obtained by pulverizing the test sample 1. FIG. 4 illustrates an XRD pattern of magnesia registered in ICSD, and an XRD pattern of the test sample 1 of the example 1.

As illustrated in FIG. 4, the XRD pattern of the test sample 1 of the example 1 was found to have peaks at the same positions as magnesia registered in the ICSD and to have magnesia as the main phase. Since no other significant peaks were observed, the crystal structure of the silicon-magnesium complex oxide formed by the reaction of a silica powder with a magnesium acetate aqueous solution was found to be amorphous. That is, the crystal structure of the silicon-magnesium complex oxide making up the binding part 3 was found to be amorphous.

(Structure Observation)

Figure 5:
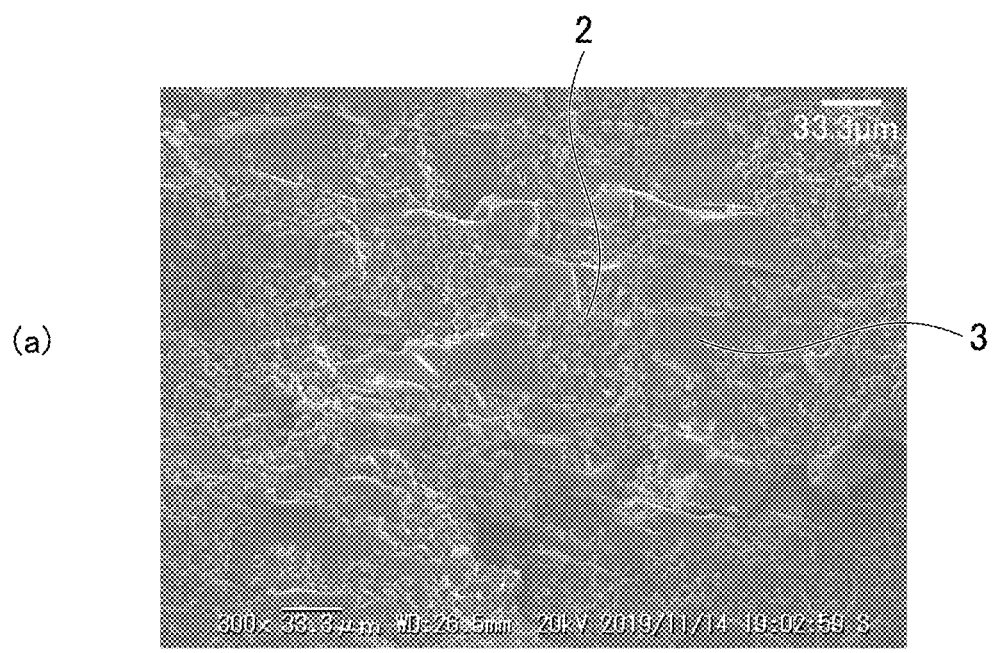
FIG. 5($a$) is a scanning electron microscope image of the test sample 1 of the example 1 magnified 300 times.
Figure 5:
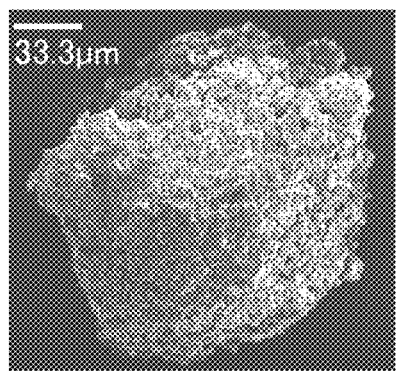

The cross section of the cut cylindrical test sample 1 prepared in the example 1 was observed using a scanning electron microscope (SEM). Note that the observation surface of the test sample 1 was sputtered with gold. FIG. 5(a) illustrates an SEM image of the test sample 1 magnified 300 times. For reference FIG. 5(b) illustrates an SEM image of a magnesia powder magnified 300 times.

Figure 6:
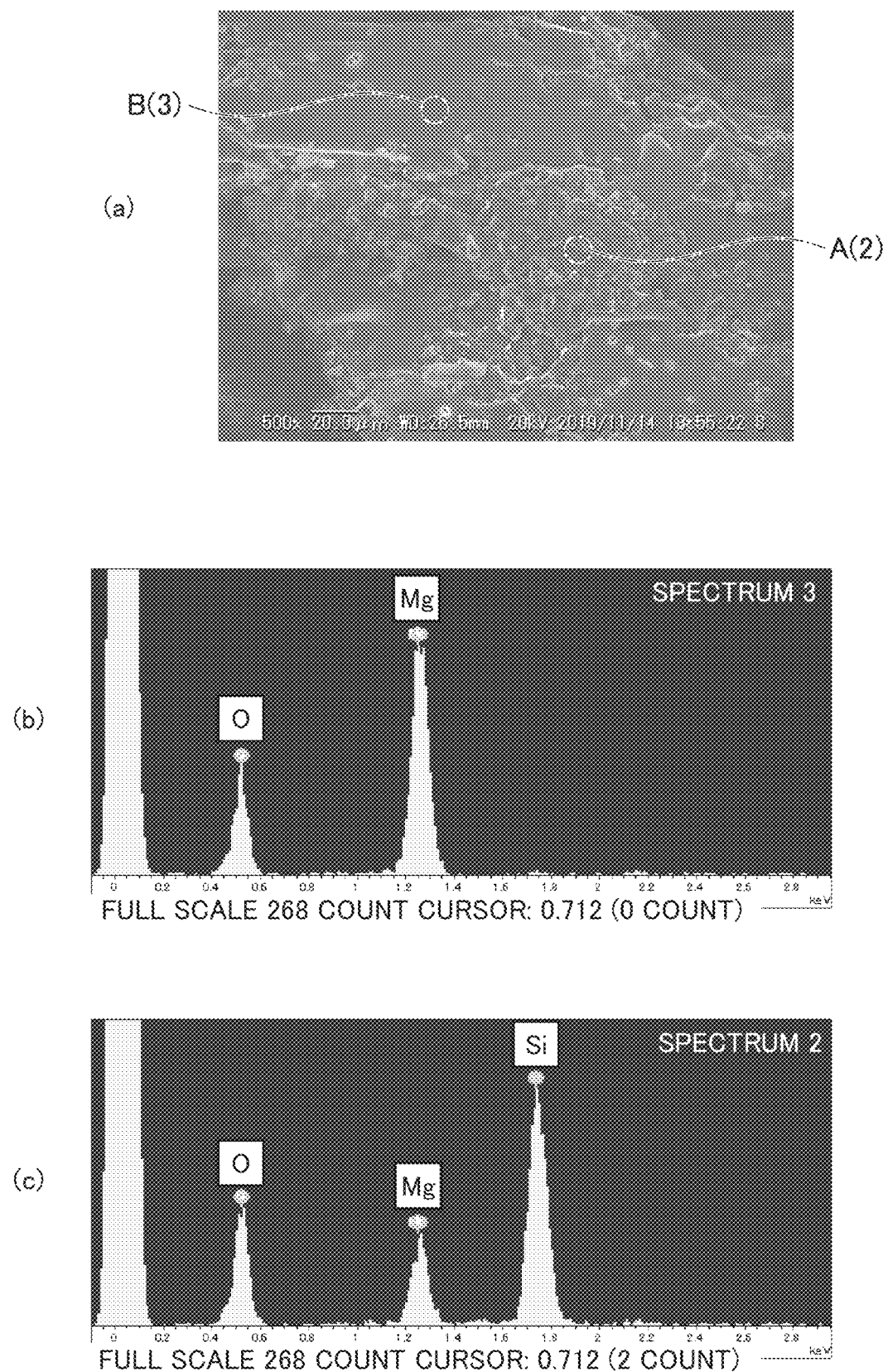
FIG. 6($a$) is a scanning electron microscope image of the test sample 1 of the example 1 magnified 500 times.

The cross section of the cut cylindrical test sample 1 prepared in the example 1 was observed using an energy dispersive X-ray spectroscopy (EDX). FIG. 6(a) illustrates an SEM image of the test sample 1 magnified 500 times. FIG. 6(b) illustrates an EDX spectrum in the part of a symbol A in FIG. 6(a), and FIG. 6(c) illustrates an EDX spectrum in the part of a symbol B in FIG. 6(a).

Figure 7:
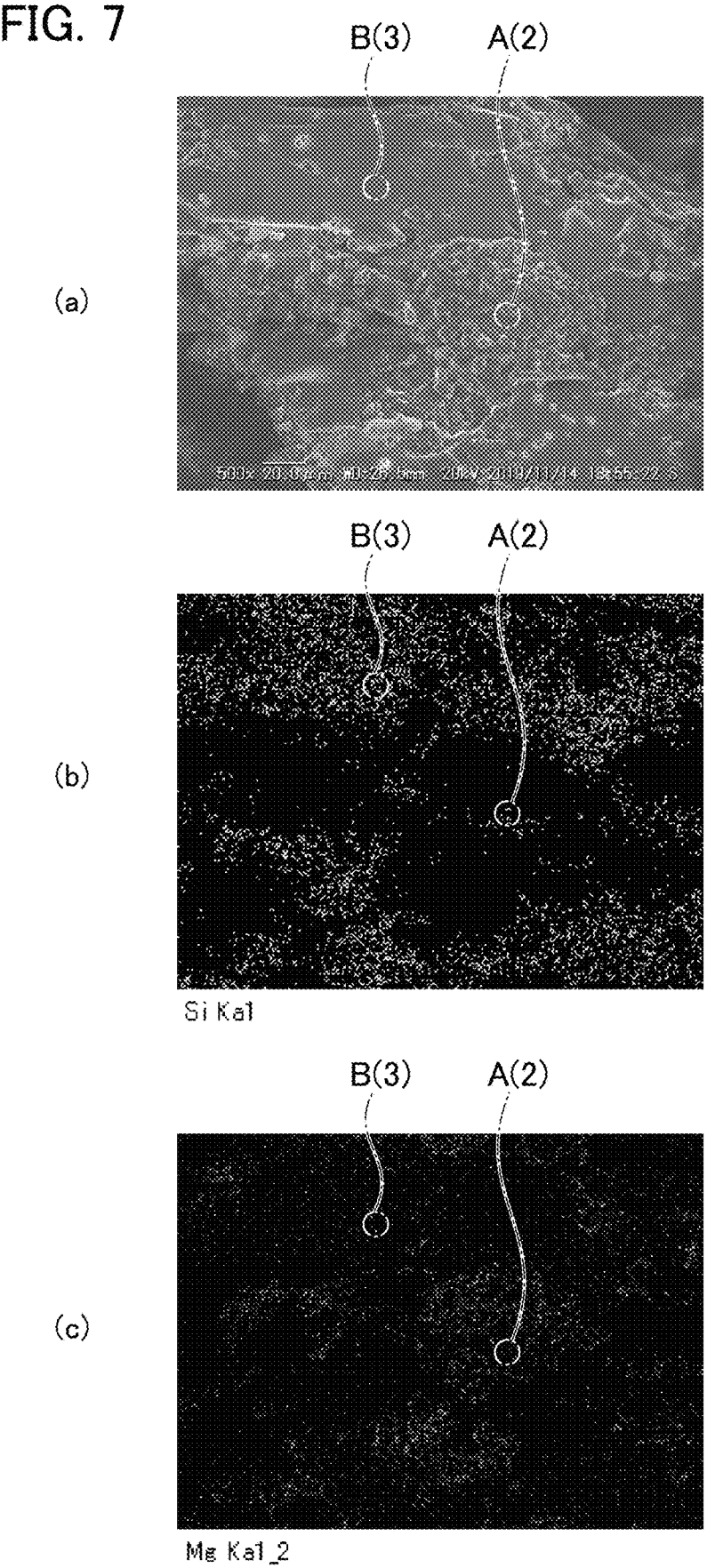
FIG. 7 is a diagram illustrating a scanning electron microscope image and mapping data of silicon (Si) and magnesium (Mg) when an energy-dispersive X-ray analysis was performed on the test sample 1 of the example 1.

FIG. 7 illustrates an SEM image and mapping data of silicon (Si) and magnesium (Mg) when an energy-dispersive X-ray analysis was performed on the test sample 1 of the example 1. FIG. 7(a) illustrates an SEM image of the test sample 1 magnified 500 times, FIG. 7(b) illustrates mapping data of silicon, and FIG. 7(c) illustrates mapping data of magnesium.

From the SEM images in FIGS. 5(a) and 6(a), it can be confirmed that particles of the magnesia powder (magnesium oxide particles 2) are bound to each other through the binding part 3 in the test sample 1 of the example 1. A dense structure can be confirmed in the test sample 1. From the EDX spectra in FIG. 6(b) and the mapping data in FIGS. 7(b) and 7(c), the part indicated by the symbol A contains Mg and O, indicating magnesia, which is the raw material. From the EDX spectra in FIG. 6(c) and the mapping data in FIGS. 7(b) and 7(c), the part indicated by the symbol B contains Mg, Si, and O, indicating a silicon-magnesium complex oxide formed by a reaction of silica with a magnesium acetate aqueous solution, which are the raw materials.

Figure 8:
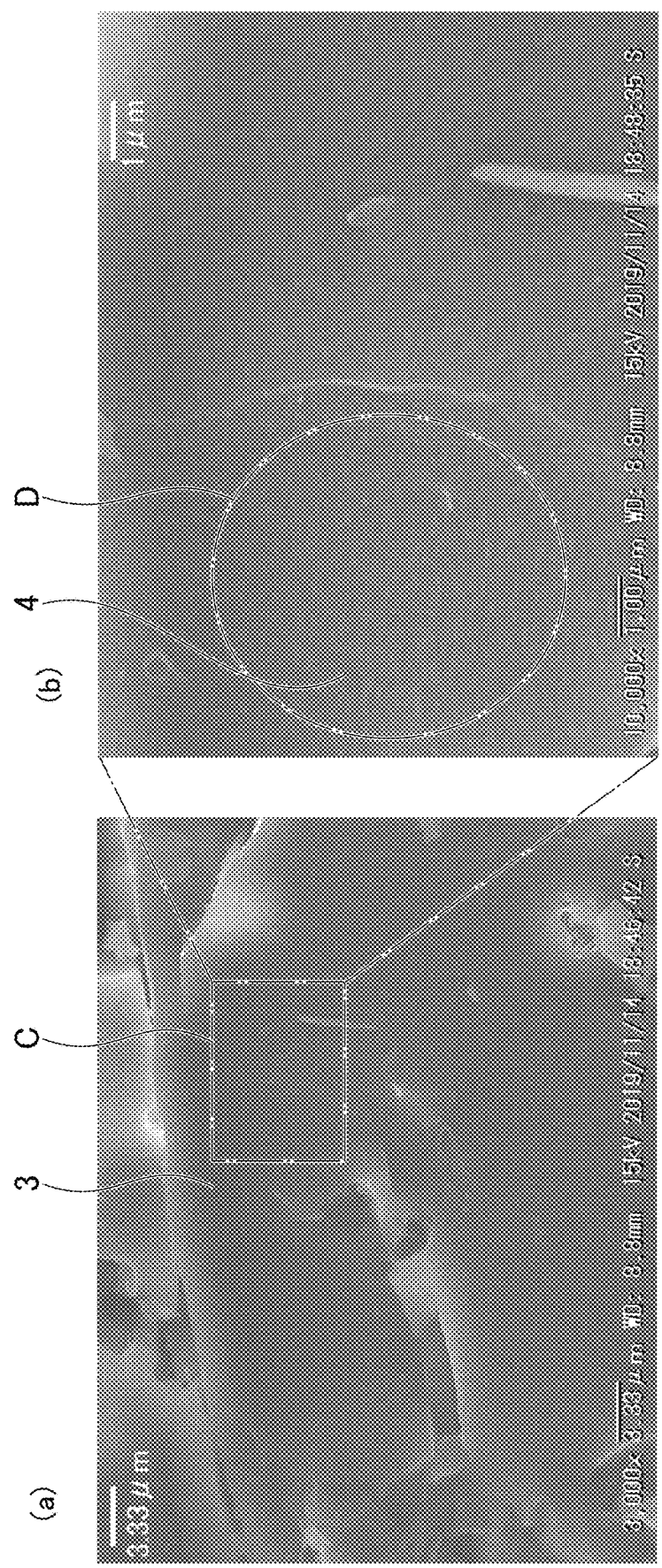
FIG. 8($a$) is a scanning electron microscope image of a binding part in the test sample 1 magnified 3,000 times.

FIG. 8(a) illustrates an SEM image of the binding part 3 in the test sample 1 magnified 3,000 times, and FIG. 8(b) illustrates an SEM image of the part of a symbol C in FIG. 8(a) magnified 10,000 times. From FIG. 8(a), it can be seen that the binding part 3 in the test sample 1 is highly smooth and forms a dense phase. As indicated by a symbol D in FIG. 8(b), it can be confirmed that fine particles 4 with a particle size of 100 nm or less are included inside the binding part 3.

(Porosity Measurement)

Figure 9:
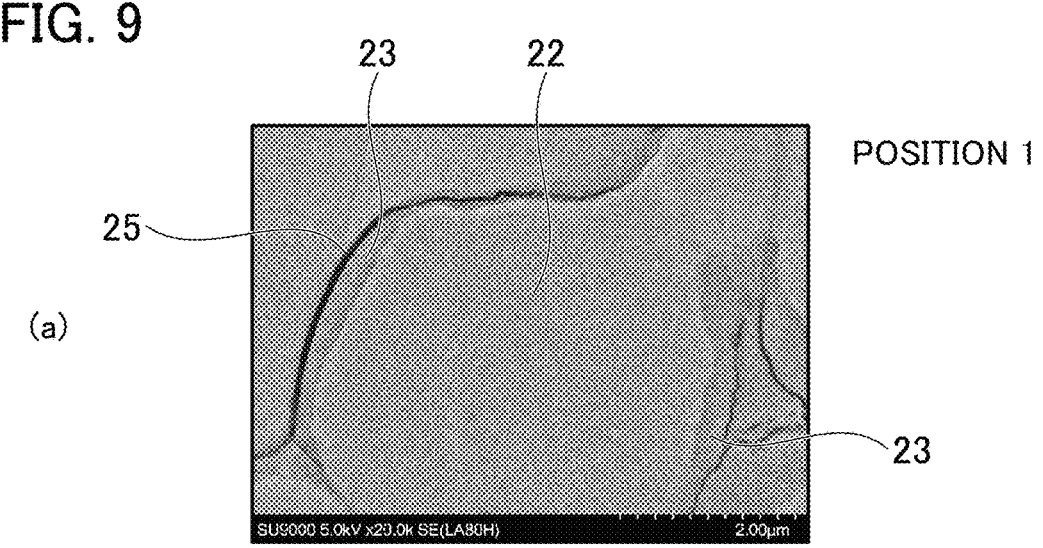
FIG. 9($a$) is a diagram illustrating a reflected electron image at position 1 in the test sample 1 of the example 1.
Figure 9:
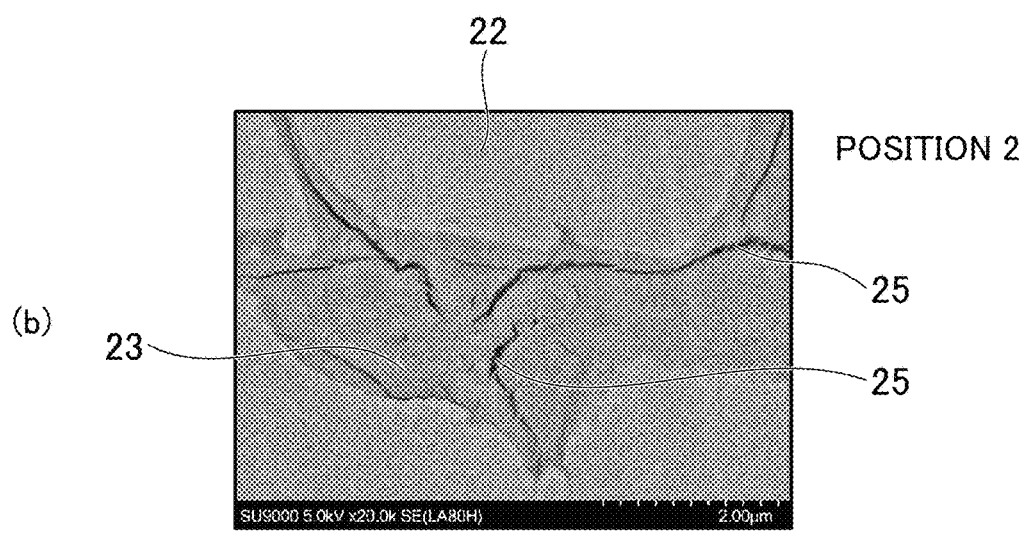
Figure 9:
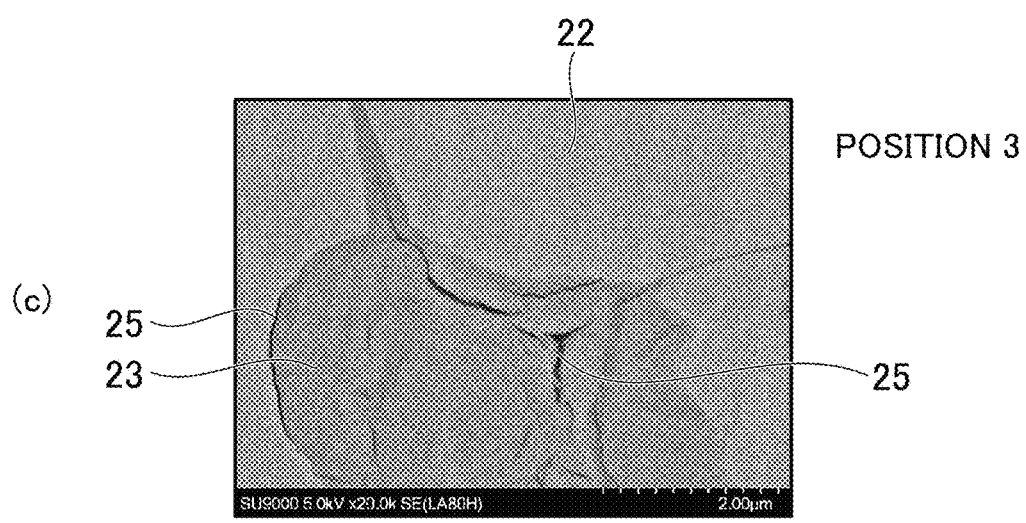

First, cross section polisher processing (CP processing) was applied to the cross section of the test sample 1 of the example 1, which is cylindrical. Then, using a scanning electron microscope (SEM), a reflected electron image was observed at a magnification of 50,000 times on the cross section of the test sample 1. FIGS. 9(a), 9(b), and 9(c) illustrate reflected electron images obtained by observing three points (positions 1 to 3) in the cross section of the test sample 1. In the observed reflected electron images, a white part 22 is magnesia, a gray part 23 is a silicon-containing compound, and black parts 25 are pores.

Figure 10:
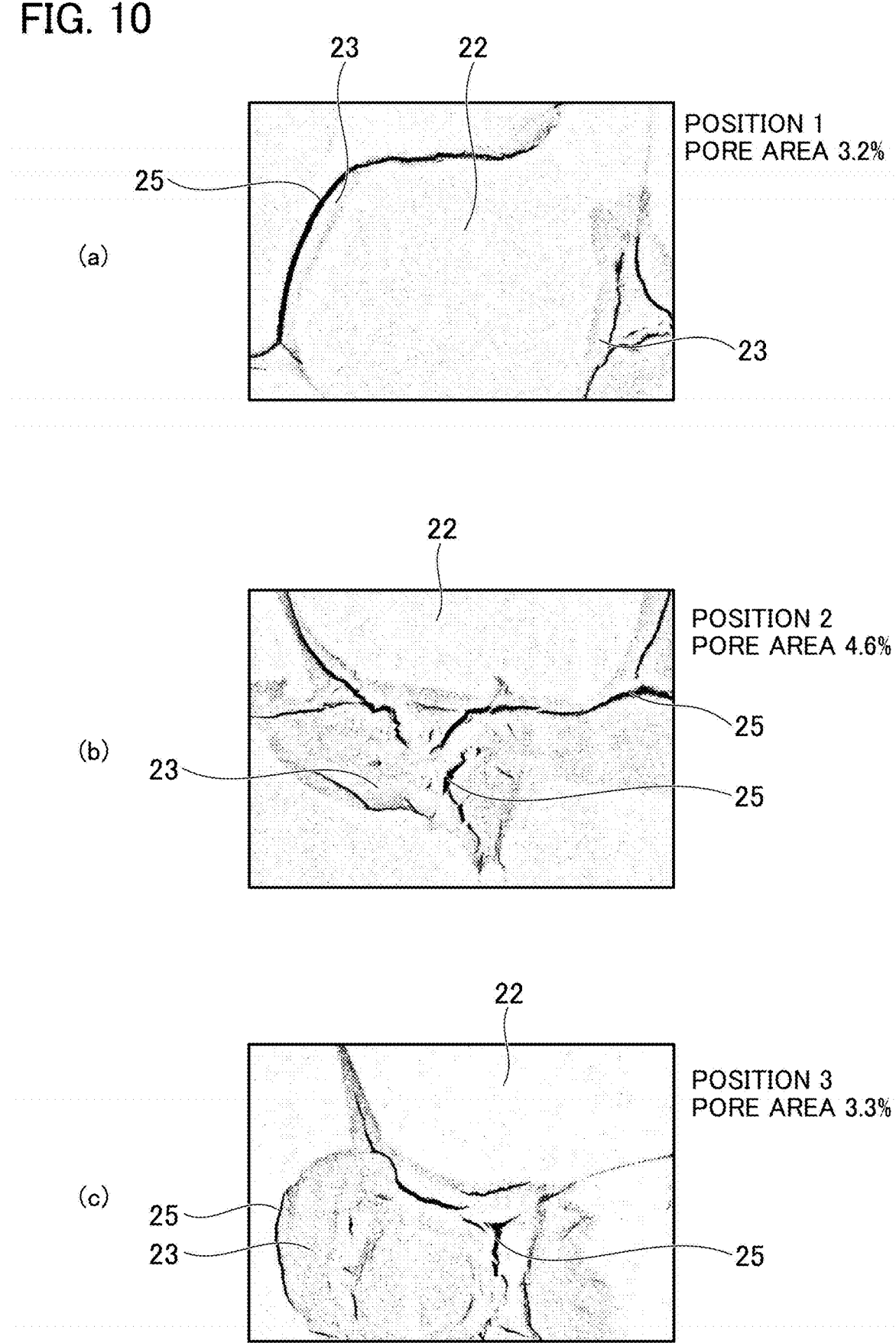
FIG. 10($a$) is a diagram illustrating binarized data of the reflected electron image at position 1 in the test sample 1 of the example 1.

Next, through binarizing the SEM images of the three fields, the pore portions were clarified. The binarized images of the reflected electron images of FIGS. 9(a), 9(b), and 9(c) are illustrated in FIGS. 10(a), 10(b), and 10(c), respectively. Then, the area percentage of the pore portion was calculated from the binarized image, and the average value was taken as the porosity. Specifically, in FIG. 10(a), the area percentage of the pore portion at position 1 was 3.2%. In FIG. 10(b), the area percentage of the pore portion at position 2 was 4.6%. In FIG. 10(c), the area percentage of the pore at position 3 was 3.3%. Thus, the porosity of the test sample 1 of the example 1 prepared this time was 3.7%, which is the average value of the area percentage of the pore portion at positions 1 to 3.

(Thermal Conductivity Measurement)

The thermal conductivity of the test sample 1 of the example 1, the test sample 2 of the example 2, and the test sample 3 of the example 3 was measured according to JIS R1611. The thermal conductivity of each of the test samples is illustrated in Table 2. As illustrated in Table 2, the test samples 1, 2, and 3 in the examples indicated high thermal conductivity of 2.0 W/m·K or more, and the test sample 3 of the example 3 indicated a particularly high thermal conductivity of 5.5 W/m·K. Thus, it can be seen from Tables 1 and 2 that the thermal conductivity of inorganic structures can be enhanced by increasing the proportion of magnesia.

TABLE 2

|  | Thermal conductivity |
| --- | --- |
| Example 1 | 2.0 W/m · K |
| Example 2 | 4.4 W/m · K |
| Example 3 | 5.5 W/m · K |

Although the present embodiment has been described above, the present embodiment is not limited to these descriptions, and various modifications are possible within the scope of the gist according to the present embodiment.

The entire contents of Japanese Patent Application No. 2020-092468 (filed May 27, 2020) are incorporated herein by reference.

INDUSTRIAL APPLICABILITY

The present disclosure makes it possible to provide an inorganic structure that can be prepared through a simple method and has even higher density, and a method for producing the inorganic structure.

REFERENCE SIGNS LIST 1, 1A Inorganic structure
2 Magnesium oxide particles
3 Binding part
4 Fine particles
11 Magnesium oxide particles
12 Silicon dioxide particles
13 Aqueous solution containing a metallic element other than silicon

The invention claimed is:

1. An inorganic structure, comprising:
a plurality of magnesium oxide particles; and
a binding part that covers a surface of each of the magnesium oxide particles and binds the magnesium oxide particles together, wherein
the binding part contains an amorphous compound containing silicon, a metallic element other than silicon, and oxygen, and contains substantially no alkali metal, B, V, Te, P, Bi, Pb, and Zn, and
the inorganic structure has a porosity of 20% or less.

2. The inorganic structure according to claim 1, wherein the binding part includes fine particles having an average particle size of 100 nm or less.

3. The inorganic structure according to claim 1, wherein the binding part contains substantially no Ca, Sr, and Ba.

4. The inorganic structure according to claim 1, wherein the metallic element other than silicon is magnesium.

5. The inorganic structure according to claim 1, wherein the magnesium oxide particles have a volume ratio greater than that of the binding part.

6. The inorganic structure according to claim 1, wherein the magnesium oxide particles are crystalline.

7. The inorganic structure according to claim 1, wherein the inorganic structure has a thermal conductivity of 2 W/m·K or more.

8. The inorganic structure according to claim 1, wherein the inorganic structure has a thickness of 500 μm or more.

9. The inorganic structure according to claim 2, wherein the fine particles contain silicon and oxygen.

10. The inorganic structure according to claim 1, wherein the binding part is in direct contact with the plurality of magnesium oxide particles.

11. The inorganic structure according to claim 1, wherein the binding part covers an entire surface of each of the magnesium oxide particles.

12. The inorganic structure according to claim 1, wherein the binding part contains amorphous compound at 50 mol % or more.

* * * * *